United States Patent [19] [11] 3,758,814

Tang [45] Sept. 11, 1973

[54] WIDE ANGLE DEFLECTION SYSTEM

[75] Inventor: Pak Chong Tang, Indianapolis, Ind.

[73] Assignee: RCA Corporation, New York, N.Y.

[22] Filed: Jan. 15, 1971

[21] Appl. No.: 106,806

[52] U.S. Cl. .......... 315/27 TD
[51] Int. Cl. .......... H01j 29/70
[58] Field of Search .......... 315/27 TD, 276 D; 307/228

[56] References Cited

UNITED STATES PATENTS

| | | | |
|---|---|---|---|
| 3,402,320 | 9/1968 | Christopher | 315/27 TD |
| 3,111,603 | 11/1963 | Marshall et al. | 315/27 TD |
| 3,313,955 | 4/1967 | Brisay | 307/228 |
| 3,631,296 | 12/1971 | Homah | 315/276 D |

*Primary Examiner*—Carl D. Quarforth
*Assistant Examiner*—J. M. Potenza
*Attorney*—Eugene M. Whitacre

[57] ABSTRACT

Wide angle (e.g., 110°), large screen (e.g., 25 inch diagonal) color television display system employs a narrow-neck (e.g., 29 centimeter diameter) color kinescope with a deflection yoke having toroidal horizontal and vertical deflection windings. While power requirements of toroidal horizontal windings are met by a thyristor horizontal deflection circuit, toroidal vertical windings are driven by a transistor vertical output amplifier in a quasi-complementary symmetry, Class B, push-pull configuration. Capacitor is provided in negative feedback path between amplifier output and driver input, establishing Miller integrator action for linear sawtooth wave generation. Diode in series with capacitor provides voltage rise aiding rapid turn-on of driver at end of retrace interval. Oppositely poled diode shunting first diode completes low impedance capacitor discharge path during retrace interval.

5 Claims, 2 Drawing Figures

Figure 1:
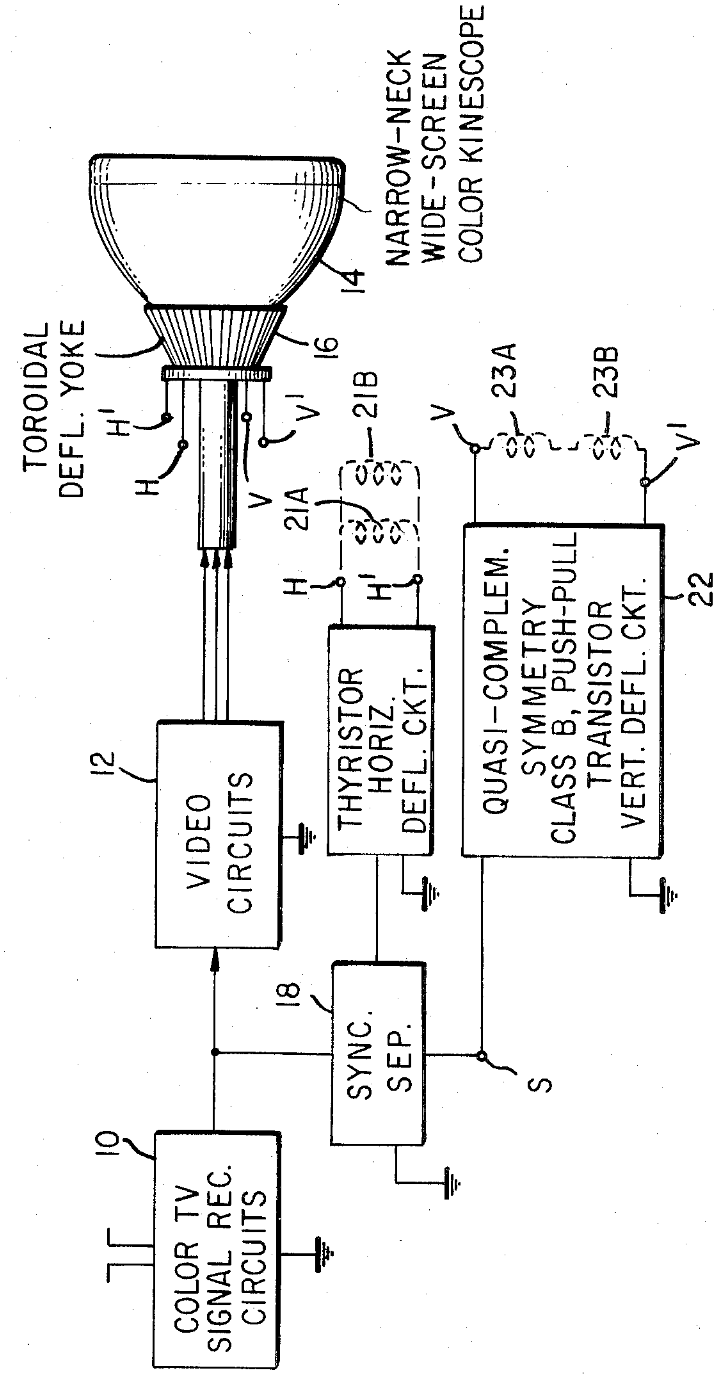

INVENTOR.
PAK CHONG TANG
BY William H. Meagher
ATTORNEY

INVENTOR.
PAK CHONG TANG
BY William H. Meagher
ATTORNEY

WIDE ANGLE DEFLECTION SYSTEM

The present invention relates generally to wide angle deflection systems, and particularly to systems suitable for effecting wide angle beam deflection for large screen color television displays.

Use of a toroidal yoke design has been proposed for achieving wide angle (e.g., 110°) deflection of the electron beams of a large screen (e.g., 25 inch diagonal), delta gun, shadow mask color kinescope in the copending application of Wayne R. Chiodi, Ser. No. 42,927, entitled "Toroidal Electromagnetic Deflection Yoke," filed on June 3, 1970, now U.S. Pat. No. 3,643,192, issued on Feb. 15, 1972. Use of the Chiodi yoke arrangement enables achievement of the requisite deflection, while maintaining proper beam convergence and color purity throughout the picture, without requiring the complexities of corner convergence correction circuits and dynamic blue lateral circuitry that have been associated with 110°, large screen saddle yoke systems.

An increase in deflection angle (i.e., 110° vs. the conventional 90°) involves an increase in deflection power requirements. The low impedance level of the toroidal yoke windings imposes a further increase in deflection power requirements relative to those associated with saddle yoke windings. These increases can be partially mitigated by employing a reduced neck diameter (e.g., 29 millimeters relative to 36.5 millimeters for 90° tubes) for the color kinescope to increase deflection sensitivity.

The resultant horizontal deflection power requirements may readily be met by a thyristor horizontal deflection circuit of the dual-SCR type, as disclosed, for example, in U.S. Pat. No. 3,452,244, issued to Wolfgang F. W. Dietz on June 24, 1969.

Pursuant to the present invention, the foregoing wide angle deflection system is completed by employment of a quasi-complementary symmetry, Class B, push-pull transistor vertical deflection amplifier to supply the substantial vertical deflection power requirements. With advantage taken of the impedance level of the toroidal windings, the arrangement avoids the need for a vertical output transformer. Moreover, the transformerless coupling may be effected, while employing output power transistors of the same conductivity type. Practical advantages of reliability and economy may thereby be realized (i.e., through use of an NPN output pair) at the high power levels required, relative to the use of a true complementary symmetry amplifier; also avoided is high power requirements for a driver transistor.

In a preferred embodiment of the present invention, a capacitor is included in a negative feedback path from the amplifier output to a common driver input, establishing Miller integrator operation for linear sawtooth wave generation. A diode in the feedback path, forward biased when a discharge transistor cuts off, provides a voltage rise reliably ensuring rapid turn-on of the driver thereafter. An oppositely poled diode in shunt with the first diode completes a low impedance capacitor discharge path during the retrace interval.

An object of the present invention is to provide a deflection system suitable for effecting wide-angle deflection of the beams of a large screen shadow-mask kinescope.

Figure 2:
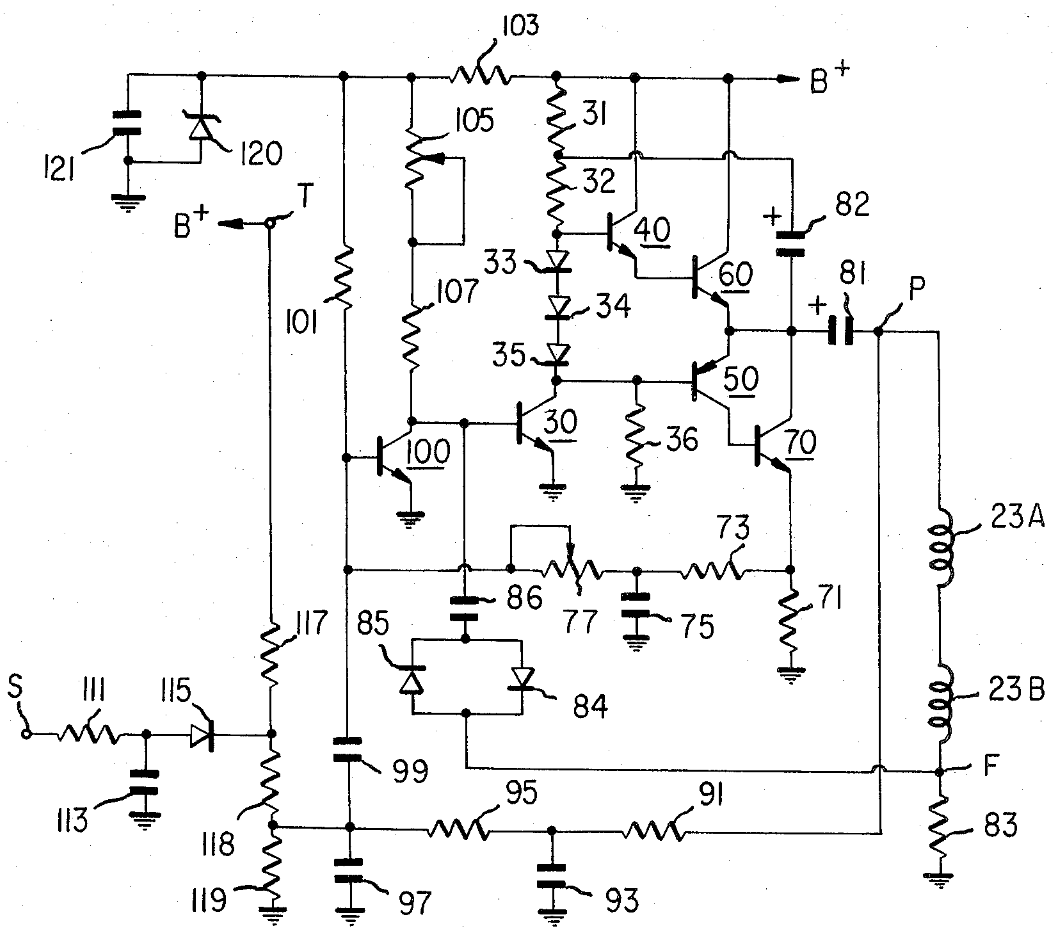

Other objects and advantages of the present invention will be readily apparent to those skilled in the art upon a reading of the following detailed description and an inspection of the accompanying drawing in which:

FIG. 1 illustrates generally a color television receiver incorporating a wide angle deflection system in accordance with the present invention; and FIG. 2 illustrates in schematic detail a vertical deflection circuit suitable for use in the FIG. 1 system in accordance with an advantageous embodiment of the present invention.

Referring to FIG. 1 for the general arrangement of a wide angle deflection system in accordance with the invention, color television signal receiving circuits (including the usual tuner, IF amplifier and video detector circuitry) are indicated generally by the block designated 10, supplying signals to the receiver's video circuits 12 for development of suitable color signal drives for a multi-gun, shadow-mask color kinescope 14. The color kinescope 14 is indicated as being of a narrow-neck (i.e., reduced neck diameter relative to the conventional 90° tube), large screen type. Mounted on the neck of the kinescope 14 is a deflection yoke 16 of the toroidal type (as described in the aforementioned Chiodi application). The yoke 16, as illustrated, is provided with a pair of horizontal winding input terminals H, H' and a pair of vertical winding input terminals V, V'.

The receiving circuits 10 also supply signals to a sync separator 18. A synchronizing waveform output of separator 18 is supplied to horizontal deflection circuitry 20 of the thyristor type (as described in the aforementioned Dietz patent). The thyristor deflection circuit 20 output is coupled to the yoke's horizontal winding input terminals H, H', driving the horizontal winding halves 21A, 21B (illustrated schematically in dotted lines) in parallel.

A synchronizing waveform output of sync separator 18 is also supplied to transistor vertical deflection circuitry 22 of a quasi-complementary symmetry, Class B, push-pull output configuration. The vertical deflection circuit 22 output is coupled to the yoke's vertical winding terminals V, V', driving the vertical winding halves 23A, 23B (illustrated schematically in dotted lines) in series.

FIG. 2 illustrates in schematic detail an advantageous arrangement that may be employed for the quasi-complementary symmetry vertical deflection circuitry 22 of FIG. 1. In the FIG. 2 circuit, a vertical deflection wave amplifier is shown, having (a) a pre-driver stage employing an NPN transistor 30, supplying a single-ended input to paralleled channels of (b) a quasi-complementary symmetry, Class B, push-pull output amplifier, comprising a complementary pair of driver stages (employing, respectively, an NPN transistor 40 and a PNP transistor 50) driving a pair of like-conductivity power output stages (employing NPN power output transistors 60 and 70). Reference may be made to U.S. Pat. No. 2,896,029, issued to H.C. Lin on July 21, 1959, for H. C. general description of the operating principles of the quasi-complementary symmetry amplifier arrangement.

The respective halves 23A and 23B of the toroidal yoke's vertical winding are supplied with deflection current from output terminal O (joined to the emitters of the output transistors 60 and 70) via a path including an electrolytic coupling capacitor 81 and returned to chassis ground via a current sampling resistor 83.

A negative feedback path, including a capacitor 86, is looped around the deflection wave amplifier, extending between a feedback terminal F (at the ungrounded end of sampling resistor 83) in the amplifier output circuit and the base of pre-driver transistor 30.

Alternate charging of capacitor 86 from a DC supply point (B+) via a charging path including resistors 105 and 107, and discharging thereof via a periodically conducting discharge transistor 100, result in linear sawtooth wave generation in accordance with well-known Miller integrator principles. Feedback of output pulses to the base of discharge transistor 100 from terminal P in the output circuit is provided, establishing, in well-known manner, a form of astable multivibrator action between discharge and output stages that renders the vertical deflection circuit self-oscillatory at a frequency slightly lower than the television field rate. Precise synchronization of the oscillations at the correct rate and phasing is obtained under the control of vertical synchronizing pulses derived from the synchronizing waveform supplied at terminal S.

In order to fully appreciate operation advantages afforded by certain features of the present invention, it is now in order to consider the illustrated circuit in greater detail.

The charging of capacitor 86 to develop the trace portion of the input sawtooth waveform is effected via a charging path including variable resistor 105 (which serves as an adjustable height control), fixed resistor 107 (limiting maximum height), forward biased diode 84 and the (small-valued) sampling resistor 83. The charging potential source is stabilized against line voltage variations by connecting the variable resistor 105 to the junction of dropping resistor 103 and filter capacitor 121, across which capacitor is connected a stabilizing Zener diode 120.

The presence of diode 84 in the charging path reliably ensures rapid turn-on of pre-driver transistor 30 when discharge transistor 100 cuts off. During conduction of discharge transistor 100, the voltage at the base of transistor 30 is effectively clamped to ground. Upon cut off of transistor 100, charging current begins to flow and quickly forward biases diode 84. This causes a step rise in voltage at the base of transistor 30 relatively close to (as determined by the choice of diode type) the $V_{be}$ potential required for transistor 30 conduction. In the absence of the diode 84 and the step rise it provides, a delayed turn-on would ensue relying on the capacitor charging characteristic. Such slow build-up to the $V_{be}$ potential required is not only undesirable because of the resultant lengthening of retrace time, but is also undesirable because the charging time constant is variable in accordance with height control setting and an undesirable variability of retrace time would be a consequence. While a step rise could also be provided through use of a suitably small valued resistor in the feedback path, the step rise would be relatively unreliable since its magnitude would vary with height control setting; in contrast, the step rise afforded by diode 84 is relatively fixed and independent of height control setting. However, where desired to supplement the fixed diode voltage a small-valued resistor may be provided in the feedback path in addition to diode 84.

Because of the unidirectional characteristics of turn-on diode 84, a problem is posed by its presence with regard to the discharge of capacitor 86 during conduction of transistor 100. This problem is solved by shunting across diode 84 an oppositely poled diode 85. Diode 85 is open-circuited during trace, but is forward biased during retrace when transistor 100 conducts, thus completing the requisite low impedance discharging path.

The collector of pre-driver transistor 30 is directly connected to the base of PNP driver transistor 50 and is connected to the base of NPN driver transistor 40 via a string of forward biased diodes 33, 34, 35. The series combination of bias resistors 31 and 32 links the base of transistor 40 to the B+ supply (illustratively, 30 volts). The voltage drops across forward biased diodes 33, 34, 35, providing an offset between the driver bases (approaching the three times $V_{be}$ potential associated with forward bias of the base-emitter paths of transistors 40, 60, 50), aids in minimizing crossover distortion at the center of scan; however, it will be recognized that a lesser number of diodes than the three illustrated may be employed without serious distortion results, particularly in view of the heavy AC feedback employed in the illustrated arrangement. A resistor 36 returns the pre-driver collector side of the diode string to the negative terminal (chassis ground) of the B+ supply.

The quasi-complementary symmetry amplifier is of generally conventional form, with (a) the collector of transistors 40 and 60 connected directly to B+, (b) the emitter of transistor 40 directly connected to the base of transistor 60, (c) the collector of transistor 50 directly connected to the base of transistor 70, the emitter of transistor 70 returned to ground, and the emitters of transistors 50 and 60, together with the collector of transistor 70, direct current conductively connected to the output terminal O. A "bootstrap" capacitor 82 couples the output terminal O to the junction of bias resistors 31 and 32, with attendant efficiency advantages. The return of the collector of transistor 70 to ground is effected via a small-valued resistor 71, which provides an end-of-trace voltage variation, useful for frequency control purposes to be subsequently described.

A trio of waveforms are applied to the base of discharge transistor 100 to control its conduction: (1) the flyback pulse appearing at terminal P, subject to shaping by feedback circuit elements 91, 93, 95, 97, 99 (and to rejection thereby of horizontal frequency components); (2) an end-of-trace voltage variation derived from the collector circuit of transistor 70 and fed back via series resistors 73 and 77 which cooperate with shunt capacity elements (75, 99) to effect an integration of the sawtooth shaped component to provide a sharply rising waveform at the end of the trace interval (with resultant confinement of triggering time for noise immunity advantages), the waveform slope being subject to adjustment by variable resistor 77 (thus conveniently serving a vertical hold control function); and (3) a vertical synchronizing pulse input derived from the synchronizing waveform at terminal S.

For synchronizing pulse application, a path is provided between a synchronizing waveform input terminal S and the discharge transistor base, which path includes resistor 111, diode 115, resistor 118 and capacitor 99. A capacitor 113 is connected between the junction of resistor 111 and diode 115 and chassis ground; series resistor 111 and shunt capacitor 113 provide an initial filter, reducing the horizontal synchronizing component of the composite synchronizing waveform at the input of diode 115. Resistor 117, connected between the supply point T and the junction of diode 115 and resistor 118, establishes a DC voltage divider with resistors 118 and 119 to provide a bias potential at the cathode of diode 115, which maintains the diode reverse biased during the intervals between vertical synchronizing periods (isolating the discharge transistor from the sync input terminal S during such intervals to avoid untimely triggering). Resistor 118 forms a final integrator with capacitor 97 to complete the selection of the vertical synchronizing component and rejection of the horizontal synchronizing component.

For the sake of simplicity in the drawing, circuits for performing such functions as pincushion correction and dynamic convergence, which are conventionally required to interface with the vertical deflection circuit, have not been illustrated. By way of example, it may be noted that vertical convergence circuits of the type employed in the RCA CTC-49 color television receiver chassis (see RCA Television Service Data pamphlet designated 1970 No. T19) may be interposed in series in the deflection current path of the herein illustrated circuit (e.g., between terminal P and winding half 23A). Likewise, top-and-bottom pincushion circuitry of the type employed in said CTC-49 chassis may be interposed between the respective winding halves 23A, 23B. Also not shown in the FIG. 2 circuit is apparatus for effecting S-shaping of the deflection current waveform; this function may be performed in the illustrated Miller integrator circuit in a manner similar to that employed in the CTC-49 Miller integrator circuit, by providing an additional feedback path incorporating suitably cascaded integrators between the terminal P side of winding half 23A and the base of transistor 30.

A set of values for the various components shown in FIG. 2, use of which values has provided satisfactory operation of the illustrated circuitry driving the (1.5 ohm, 0.91 millihenry) vertical winding of a toroidal 110° yoke, is given, by way of example only, in the table below:

TABLE OF COMPONENT VALUES

| | |
|---|---|
| Resistor 31 | 3,300 ohms |
| Resistor 32 | 4,700 ohms |
| Resistor 36 | 220,000 ohms |
| Resistor 71 | 0.51 ohm |
| Resistor 73 | 15,000 ohms |
| Resistor 77 | 25,000 ohms (var.) |
| Resistor 83 | 0.43 ohm |
| Resistor 91 | 220 ohms |
| Resistor 95 | 1,500 ohms |
| Resistor 101 | 270,000 ohms |
| Resistor 103 | 2,200 ohms |
| Resistor 105 | 100,000 ohms (var.) |
| Resistor 107 | 68,000 ohms |
| Resistor 111 | 10,000 ohms |
| Resistor 117 | 4,7000 ohms |
| Resistor 118 | 1,000 ohms |
| Resistor 119 | 820 ohms |
| Capacitor 75 | 0.068 microfarad |
| Capacitor 81 | 1,000 microfarads |
| Capacitor 82 | 4 microfarads |
| Capacitor 86 | 0.68 microfarad |
| Capacitor 93 | 0.47 microfarad |
| Capacitor 97 | 0.15 microfarad |
| Capacitor 99 | 0.22 microfarad |
| Capacitor 113 | 0.068 microfarad |
| Capacitor 121 | 0.47 microfarad |
| Transistor 30 | Type 2N3568 |
| Transistor 40 | Type 2N3568 |
| Transistor 50 | Type 2N3645 |
| Transistors 60,70 | Type 2N5496 |
| Transistor 100 | Type 2N4945 |
| Diodes 33-35, 115 | Type FDH600 |
| Diodes, 84, 85 | Type IN60 |
| Zener Diode 120 | 10V., 0.4W |

What is claimed is:

1. In combination with a narrow-neck, large screen shadow-mask color kinescope; a wide-angle toroidal deflection yoke mounted on said kinescope neck and having respective vertical deflection winding halves and respective horizontal deflection winding halves; and a thyristor horizontal deflection circuit driving said horizontal deflection winding halves in parallel; apparatus comprising:

a vertical deflection circuit including a quasi-complementary symmetry, Class B, push-pull output, transistor deflection wave amplifier;

and means providing a transformerless coupling of the output of said quasi-complementary symmetry amplifier across the series combination of said vertical deflection winding halves of said toroidal yoke;

said vertical deflection circuit also including:

a pre-driver transistor stage having an input terminal, and having an output terminal for supplying input signals to said quasi-complementary symmetry amplifier;

resistive means in series with said vertical winding halves for developing a voltage wave at a feedback terminal in response to deflection current traversing said winding halves;

a feedback path for said voltage wave comprising a capacitor coupled between said feedback terminal and said predriver transistor input terminal;

and means for periodically charging and discharging said capacitor;

said feedback path also including a diode in series with said capacitor, said diode being poled for forward conduction upon charging of said capacitor.

2. Apparatus in accordance with claim 1 wherein said feedback path also includes an additional diode connected in shunt with said first-named diode but with opposite poling for forward conduction upon discharging of said capacitor.

3. A transistor deflection circuit including:

a phase-inverting deflection wave amplifier having an input terminal and an output terminal;

a deflection yoke winding;

a current sampling resistor;

means for connecting said winding and said resistor in series between said output terminal and a point of reference potential a feedback path including a capacitor coupled between the junction of said winding and resistor and said input terminal;

a charging potential source;

a charging resistor coupled between said source and said input terminal;

a discharge transistor coupled between said input terminal and a point of reference potential, and subject to periodic conduction and non-conduction;

and a pair of paralleled oppositely poled diodes disposed in said feedback path in series with said capacitor.

4. A transistor deflection circuit including:

a multistage phase-inverting deflection wave amplifier having an input terminal and an output terminal, and including an input stage transistor coupled to said input terminal;

a deflection yoke winding;

a current sampling resistor;

means for connecting said winding and said resistor in series between said output terminal and a point of reference potential;

a feedback path including a capacitor coupled between the junction of said winding and resistor and said input terminal;

a charging potential source;

charging resistance means coupled between said source and said input terminal and including a variable resistor for controlling the rate of charging of said capacitor;

means including a discharge transistor, coupled between said input terminal, and a point of reference potential, and subject to periodic conduction and non-conduction, for periodically discharging said capacitor, the conduction of said discharge transistor effecting the discharging of said capacitor and cutting off said input stage transistor;

means for effecting a step rise in the potential at said input terminal, upon each periodic cessation of conduction by said discharge transistor, at a rate substantially higher than said charging rate, the magnitude of said step rise in potential being substantially independent of the setting of said variable resistor, said effecting means comprising a first diode, in series with said capacitor in said feedback path, and poled for forward conduction upon charging of said capacitor;

and means for bypassing said first diode during the discharging of said capacitor, said bypassing means comprising a second diode in shunt with said first diode and poled for forward conduction upon discharging of said capacitor.

5. Apparatus in accordance with claim 4 wherein said multistage amplifier includes a quasi-complementary symmetry push-pull output circuit responsive to the output of said input stage transistor and capacitively coupled to the series combination of said deflection yoke winding and current sampling resistor.

* * * * *